United States Patent [19]
Thacker et al.

[11] Patent Number: 5,285,854
[45] Date of Patent: Feb. 15, 1994

[54] STALK AND ROOT EMBEDDING APPARATUS

[75] Inventors: Gary W. Thacker; Wayne E. Coates, both of Tucson, Ariz.

[73] Assignee: Gary Thacker, Tucson, Ariz.

[21] Appl. No.: 869,481

[22] Filed: Apr. 15, 1992

[51] Int. Cl.$^5$ .......................... A01B 5/00; A01B 49/02
[52] U.S. Cl. .................... 172/176; 172/195; 172/202; 172/555; 172/184
[58] Field of Search ............... 172/176, 145, 149, 151, 172/174, 175, 177, 181, 184, 186, 1887, 193, 195, 196, 699, 520, 540, 555, 556, 701, 171, 172, 173, 144, 201–203; 111/187, 190, 191, 197

[56] References Cited

U.S. PATENT DOCUMENTS

| | | | |
|---|---|---|---|
| 33,568 | 10/1861 | Burton | 172/171 |
| 125,185 | 4/1872 | Fanning | 172/171 |
| 669,165 | 3/1901 | Hartzell | 172/181 |
| 803,088 | 10/1905 | Barker | 172/177 |
| 835,206 | 11/1906 | Thomasson | 111/191 |
| 991,810 | 5/1911 | Whiting | 172/203 |
| 2,200,631 | 5/1940 | Merlich | 172/177 |
| 2,593,341 | 4/1952 | Phipps | 172/174 |
| 2,694,356 | 11/1954 | Haas | 172/176 |
| 2,973,044 | 2/1961 | Meredich | 172/149 |
| 4,131,163 | 12/1978 | Bezzerides | 172/145 |
| 4,213,408 | 7/1980 | West et al. | 172/176 |
| 4,243,104 | 1/1981 | Sipos et al. | 172/149 |
| 4,323,126 | 4/1982 | Stikeleather et al. | 172/147 |
| 4,350,207 | 9/1982 | Ben-Dor | 171/58 |
| 4,588,033 | 5/1986 | Orthman | 171/62 |
| 4,618,004 | 10/1986 | Howard | 172/176 |
| 4,779,684 | 10/1988 | Shultz | 171/62 |
| 4,856,597 | 8/1989 | Gal | 172/33 |
| 5,103,624 | 4/1992 | Marshall | 172/176 |

FOREIGN PATENT DOCUMENTS 92569 4/1962 Denmark .......................... 111/191

OTHER PUBLICATIONS

Farm Industry News, "Rolling Stalk Chopper", Nov. 1990.
Strobel, Ind., "Minimum Tiller Angle Stalk Cutter", Sep. 1989.

Primary Examiner—Randolph A. Reese
Assistant Examiner—Spencer Warnick
Attorney, Agent, or Firm—Ogram & Teplitz

[57] ABSTRACT

A stalk, root, and agricultural debris embedding or burying device particularly suited for row crops such as cotton. The apparatus is pulled behind a tractor in close proximity to the row crops. A furrowing tool creates a temporary furrow in a lee, and before gravity can pull dirt back into the furrow, an embedding tool pushes the stalk and root into the furrow, thereby embedding the debris with the collapsing soil after the furrowing tool. An optional ripping tool is used ahead of, or in conjunction with, the furrowing tool to facilitate penetration of the furrowing tool.

35 Claims, 6 Drawing Sheets

STALK AND ROOT EMBEDDING APPARATUS

BACKGROUND OF THE INVENTION

The invention relates to agricultural implements and more particularly to implements used for plowing under or burying stalks, roots and debris from row crops, such as cotton.

To control insect pests, such as the boll weevil and pink bollworm, all cotton stubble and debris must be plowed under after harvest. Several cotton-growing states have set deadline dates for this tillage to be accomplished.

Conventional tillage techniques are expensive and time consuming, usually requiring six or seven passes of machinery through the field. A typical tillage sequence is stalk shredding, disking, moldboard plowing, disking, land planing, and forming the new furrows. Due to the time required to accomplish these operations, winter rains often prevent cotton farmers from meeting the required legal plowing deadlines.

To reduce the cotton tillage requirements, several methods and machines have been developed. During the 1960's and 1970's, land grant universities and the United States Department of Agriculture Engineers developed methods of reworking existing cotton beds. These techniques involved stalk shredding, tearing the plant roots out of the beds with ripper shanks, and reforming the old beds.

Another method developed called for splitting the old beds in half and reforming new beds where the old furrows were.

Both of these techniques were utilized in the apparatus described in U.S. Pat. No. 4,131,163, entitled "Stubble Eradicating Implement," issued to Bezzerides on Dec. 26, 1978. Because these methods leave the crop debris on or near the soil surface, they have failed to achieve more than minimal acceptance with cotton farmers.

Another method is described in U.S. Pat. No. 4,779,684, entitled "Method and Apparatus for Extracting Plant Stalks and for Reshaping Beds," issued to Schultz on Oct. 25, 1988. This method utilizes a pair of converging coulter disks to grip and lift the cotton tap roots from the soil. After the tap roots are removed, the roots and shredded stalks are mulched into the surface layer of soil as the beds are reformed.

In this approach, the embedding of the debris is minimal, at best, leaving all of the debris on or near the soil surface. Pink bollworm pupae overwinter in cotton debris, and this shallow burial enables a high percentage of the pupae to survive and infest the next planting. Research has shown that the optimal depth for survival of a pink bollworm pupae is two inches. On the surface, they will dry out or freeze. Buried deeper, they cannot emerge in the spring.

Still another technique is disclosed in U.S. Pat. No. 4,588,033, entitled "Cotton Root Cutter and Shredder," issued to Orthman on May 13, 1986. This technique utilizes a below ground cutting blade inclined diagonally across the plant row. The blade cooperates with an oppositely inclined above ground trash bar to uproot the cotton plants and deposit them on the ground transversely to the direction of travel of the apparatus. The uprooted plants are then picked up and shredded.

Again, as with the other techniques already discussed, this last technique leaves most of the crop debris on or near the soil surface.

Cotton debris often interferes with subsequent planting and cultivation operations; more importantly, unburied cotton debris serves as an overwintering site for pests, such as the pink bollworm. Recent research has shown that around 50% of pink bollworm moths emerging in the spring have overwintered in the crop debris. Deep burial of the debris will prevent most of these insects from emerging to infest the subsequent cotton crop.

Still another attempt at reduced cotton tillage techniques is to completely bury the debris. One such device is described in U.S. Pat. No. 4,350,207, entitled "Agricultural Implement for Extraction and Shredding of Stalks and Roots," issued to Ben-Dor on Sep. 21, 1982. This machine extracts the roots and stalks from the soil and shreds them in a shear-bar shredder. Using an optional subsoiler attachment, the shredded debris is buried into the soil from ten to twelve inches. A similar result is obtained by the approach of U.S. Pat. No. 4,856,597, entitled "Soil Working Machine," issued to Gal on Aug. 15, 1989.

Although both of these machines obtain the objective of burying the debris, the mechanical complexity required for each to operate is of such a level that keeping the machines operating is extremely difficult.

Still another method is a two-level plow with a scraper attachment as shown in U.S. Pat. No. 4,323,126, entitled "Ridge Mulch Tillage Method and Apparatus," issued to Stikeleather et al. on Apr. 6, 1982. In this type of device, a scraper attachment is used to deposit debris into the plow furrow. The debris is buried when the plow bottom turns over the adjacent crop row.

Cotton is a particularly difficult crop to handle and the plant is anchored by a long tap root. Cotton tap roots are difficult to sever and the debris does not fall into the furrow easily and, as such, much of the debris for the Stikeleather approach is left at or near the surface creating the same problems already noted for the prior devices.

It is clear from the foregoing that an efficient method and apparatus does not exist to embed or bury cotton debris.

SUMMARY OF THE INVENTION

The invention is a stalk, root, and agricultural debris embedding or burying device particularly suited for row crops, such as cotton. The apparatus is pulled behind a tractor in close proximity to the row of crops. A furrowing tool creates a temporary furrow in a lee, and before gravity pulls dirt back into the furrow, an embedding tool pushes the stalk and root into the furrow, thereby embedding the debris with the collapsing soil after the furrowing tool.

In this context, the term "lee" is used to describe a soil portion behind the furrowing tool An optional ripping tool is used ahead of, or in conjunction with, the furrowing tool to facilitate penetration of the furrowing tool.

A slot is cut in the soil near the plant rows. Preferably, this slot is substantially deeper than its width. As the slot is being cut, plant stalks and roots are pushed into the slot. Dirt/soil caves in onto the plant stalks after the slot cutting tool has passed and gravity takes hold.

In the preferred embodiment, the entire apparatus utilizes a horizontal frame, such as parallel tool bars, a plurality of tall concave disk blades freely rotatable on hubs and positioned to open deep slots in the soil near the plant rows, and a plurality of disk coulter blades freely rotatable in hubs and positioned to cut a slice of soil containing the plant roots and stalks and insert them into the slot created by the tall concave disk blades.

Preferably, the disk coulter blades utilize engaging teeth to force the stalks, which are still attached to the roots, into the deep slot. This adds a further degree of embedding.

Those of ordinary skill in the art readily recognize various other devices which will serve the same function as the tall concave disk blades, and also the disk coulter blades. Such suitable devices include deep plows, chisels, straight fixed blades, and the like.

Also in the preferred embodiment of the invention, a chisel with extending blades is used to shear soil loose ahead of the furrowing tool to facilitate penetration of said furrowing tool.

The invention, together with various embodiments thereof, will be more fully explained by the following drawings and their descriptions.

DRAWINGS IN BRIEF

DRAWINGS IN DETAIL

Figure 1:
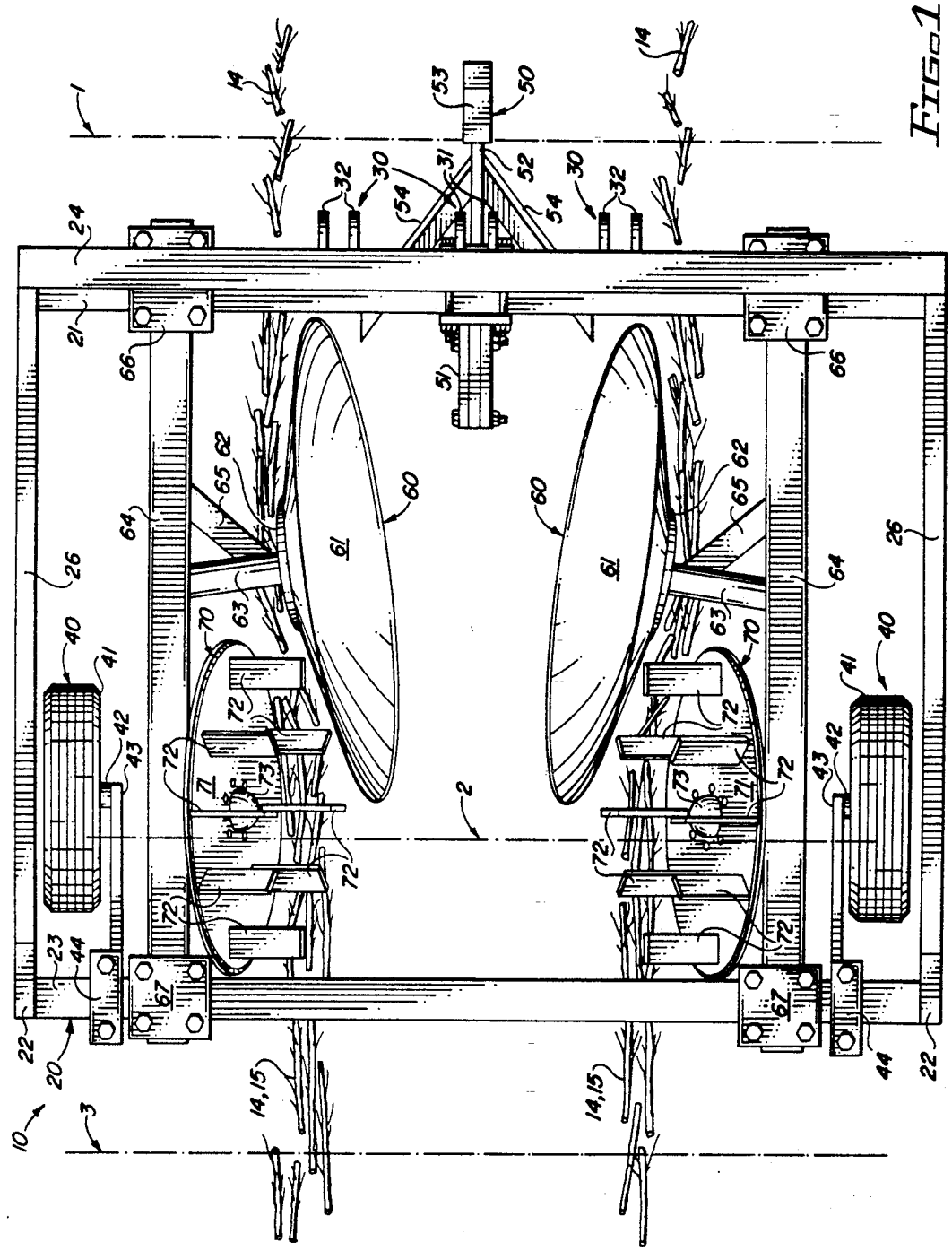
FIG. 1 is a top view of the preferred embodiment of the invention for plowing under plant stalks and roots and is adapted for plowing under two rows of plant stalks and roots.
Figure 3:
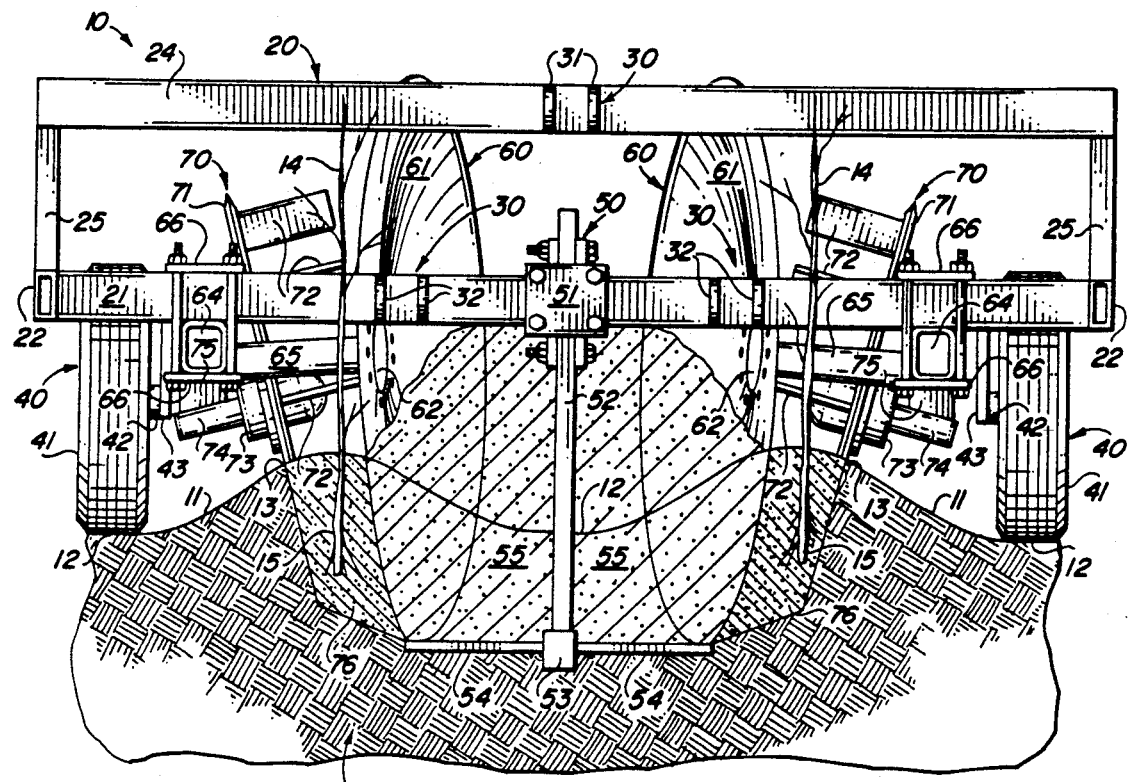
FIG. 3 is a front schematic elevation of the embodiment of FIG. 1, illustrating the plant stalks and roots being plowed under.

Referring more particularly to the drawings, FIG. 1 shows an invention for plowing under plant stalks and roots, generally indicated by the numeral 10. The invention is adapted to use on an earth surface 11 having, as best shown in FIG. 3, a plurality of substantially parallel planting furrows 12 with ridges 13. The ridges have plant stalks 14 and roots 15 centrally disposed therein.

Figure 2:
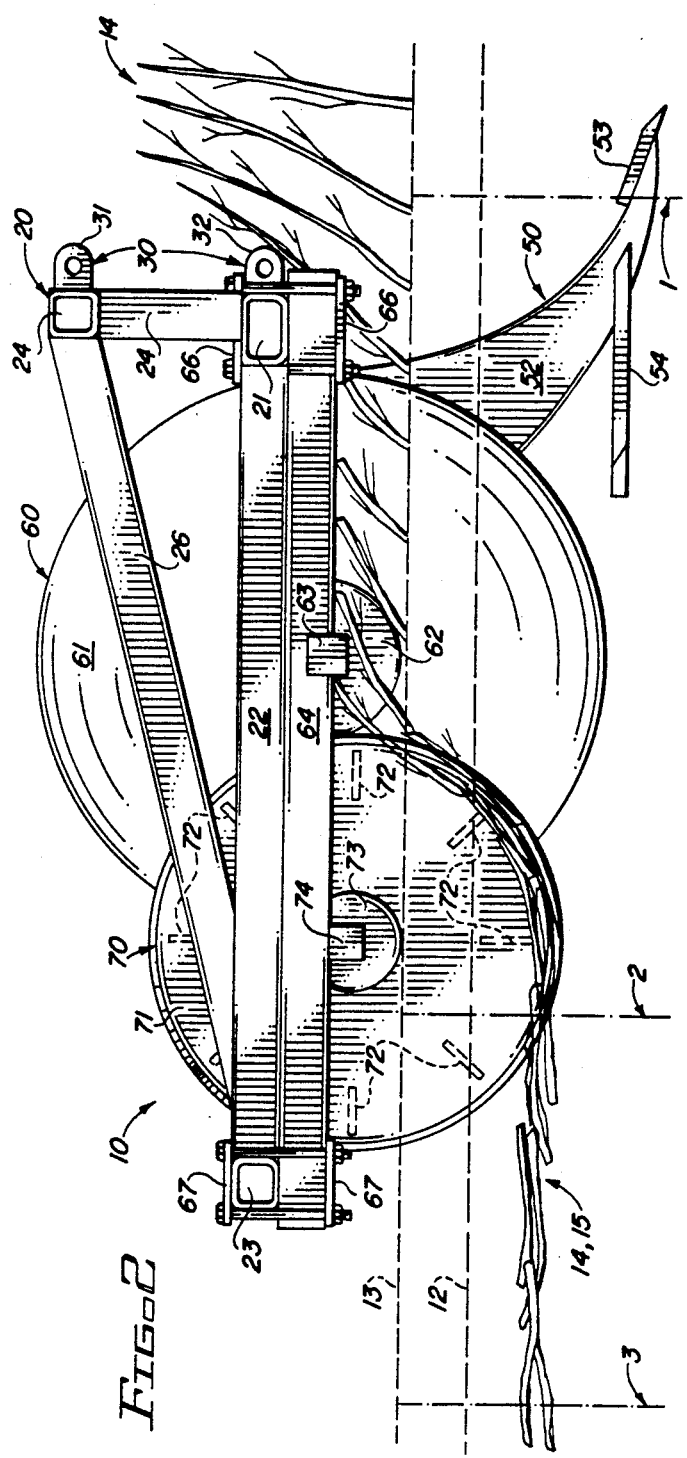
FIG. 2 is a side elevation of the embodiment of FIG. 1, showing the soil surface having plant stalks being plowed under.

The implement has a frame generally indicated by the numeral 20, adapted for movement in a line of travel in a predetermined longitudinal direction substantially parallel to furrows 12 and ridges 13. As shown in FIG. I, the frame is of grid-like form as viewed from above, having a horizontal lower front tool bar 21 and a pair of outboard longitudinal bars 22 parallel and transversely disposed thereto and of substantially equal length therewith. A substantially horizontal rear tool bar 23 is mounted in right angular relation to outboard longitudinal bars 22 and the rear of the implement. To add rigidity, top front tool bar 24 is transposed vertically above and parallel to lower front tool bar 21, said bars are attached to one another by front vertical members 25, best shown in FIG. 2. Diagonal bracing members 26 are disposed directly above outboard longitudinal bars 22, and are attached by welding to the rear portion of outboard longitudinal bars 22 and to top from tool bar 24. For illustrative convenience, the frame of the implement illustrated in FIGS. 1, 3, and 4, extends transversely a distance such that the implement is adapted for operations, subsequently to be described, on two ridges 13 and their adjacent furrows 12. However, it is to be understood that the implement is not restricted to operations on two ridges, but as will subsequently become apparent, can be utilized for operations on any number of ridges by employing tool bars of different lengths having appropriate numbers of elements, yet to be described, mounted thereon. Since said operations of the implement of any ridge and its adjacent furrows are substantially identical, the description and the structure and operation of the preferred embodiment will be in general, related to the elements required for one ridge and its adjacent furrows.

The implement is adapted to be carried on and drawn by a three-point hitch, generally indicated by the numeral 30, consisting of upper hitch trunions 31, attached by welding to top front tool bar 24, and by lower hitch trunions 32, attached by welding to lower front tool bar 21.

Toolframe 20 is carried at a constant height above soil surface 11 by gauge wheel assemblies, generally indicated by the numeral 40. Gauge wheels 41 travel in furrows 12, and are rotatably mounted to wheel spindle 42. Wheel spindle 42 is welded to gauge when shank 43 is welded to clamp assembly 44. Clamp assembly 44 is bolted to rear tool bar 23.

Ripper assembly, generally indicated by the numeral 50, is secured to lower front tool bar by bolting to clamp assembly 51. Ripper assembly 50 consists of parabolic ripper shank 52, ripper point 53, and two horizontal, rearwardly inclined ripper blades 54. The operation of ripper shank assembly 50 is best illustrated in FIG. 3, which clamp assembly 51 bolted to lower front tool bar 21, parabolic ripper shank 52 extending downwardly from clamp assembly 51, and shown in dotted form as it operates below soil surface 11. Ripper point 53 and horizontal ripper blades 54 are also shown in dotted form operating below the soil surface. Ripper assembly 50 shears soil 55 loose, uplifts it slightly, and facilitates the penetration of soil engaging elements to be subsequently described. The sole purpose of ripper assembly 50 is to shear soil loose to allow penetration of soil engaging elements to be subsequently described, hence, in some soil conditions, ripper shank 50 may not be required for the operation of the implement.

Figure 4:
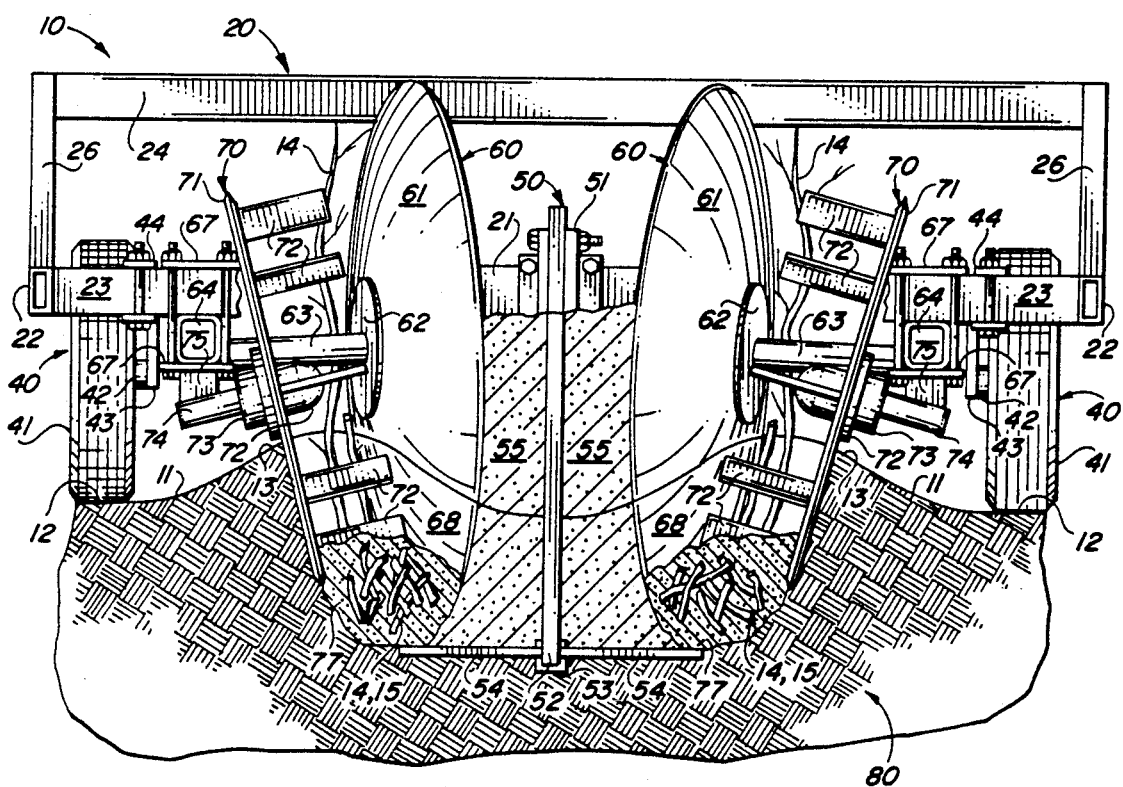
FIG. 4 is a rear schematic of the embodiment of FIG. 1, showing the shearing of the soil and soil movement.

The next soil engaging elements of the implement are concave disk blades, general indicated by the numeral 60. Concave disk blades 61 are mounted on hubs 62, which freely rotate on spindles 63. Spindles 63 are attached to longitudinal crossmembers 64. To add rigidity, brace 65 is attached diagonally from hub end of spindle 63 to longitudinal crossmember 64. The bracket formed with front plate 66 is used to adjust the relative distance between the concave disk blade 61 (the furrow means) and the insertion disk 70 (the packing means) to optimize the insertion/burial operation. Longitudinal crossmember 64 is attached to tool frame 20 by bolting through front plates 66 to lower front tool bar 21, and by bolting through rear plates 67 to rear tool bar 23. Concave disk blades 61 and hubs 62 rotate by contact with the earth as the implement 10 is drawn forward. As concave disk blades 61 move forward, soil 55, best illustrated in Figure 3, is moved laterally away from the concave side of concave disk blade 61, and is also uplifted along the rear arc of concave disk blade 61. As illustrated n FIGS. 3 and 4, soil 55 is lifted upward as it moves between the concave surfaces of opposing concave disk blades 61. This lateral and uplifting action of concave disk blades 61 opens a deep slot 68 in the soil, which is essentially the path of disk blade 61 as it advances forward through the earth, and is best illustrated in Figure 4. As the implement is drawn forward, uplifted soil 55, best illustrated in Figure 4, is momentarily held between the concave surfaces of opposing concave disk blades 61. As the implement 10 is drawn further forward, uplifted soil 55 spills out from between concave disk blades 61 and falls upon other soil and plant material to be subsequently described. However, it is to be understood that for the operation of this invention, it is not necessary to have pairs of concave disk blades 61 with concave surfaces facing one another, as will subsequently become apparent. In the preferred embodiment, the concave disk blades 61 (the furrow means) and the insertion disk 70 (the packing means) are positioned to sheer soil at an angle greater than forty-five degrees.

The next soil engaging element of the implement is the insertion disk, generally referred to by the numeral 70. Insertion disk 70 consists of disk blade 71 with engaging teeth 72, which is mounted on hub 73, which freely rotates on spindle 74. Spindle 74 is attached to longitudinal crossmember 64 via stantion 75. Insertion disk 70 is rotated by contact with the earth as implement 10 is drawn forward. Insertion disk 70 engages soil to be inserted 76 at the peak of raised beds 13, which also contain plant stalks 14 and roots 15 therein, which is best illustrated in FIG. 3. As implement 10 is drawn forward, insertion disk 70 slices soil to be inserted 76 and roots 15 loose from the adjoining soil with disk blade 71. Moving to FIG. 4, soil to be inserted 76 is sheared loose from the adjoining soil and becomes inserted soil 77, together with plant stalks 14 and roots 15 as said soil, stalks and roots begin to fall into slot 68, and are simultaneously forced downward into slot 68 by engaging teeth 72. Most stalks 14 and roots 15 break as they are forced downward into slot 68 by engaging teeth 72, however, most of said stalks and roots remain loosely attached as they are forced downward together with inserted soil 77. Most stalks 14 and roots 15 are moved downward to the lower arc of engaging teeth 72, while inserted soil 77 falls around inserted stalks 14 and roots 15, and between and around engaging teeth 72. It is understood that for the operation of the invention, it is not necessary for any part of insertion disk 71 to travel within the path of concave disk 61. In the preferred embodiment, insertion disk 70 is disposed at such an angle and location, in relation to concave disk 61, that the lower arc of disk blade 71 does not travel within the path of concave disk 61, hence, is not within slot 68 as it advances through the soil. Insertion disk 70 slightly widens slot 68 as said insertion disk shears loose soil to be inserted 76. It is not necessary for the lower arc of disk blade 71 to intersect with the path of concave disk 61, as the shearing action of disk blade 71, together with the downward force of engaging teeth 72, cause all soil in the path of insertion disk 70 to be loosened from the adjoining soil, which becomes inserted soil 77. Most of inserted soil 77, together with plant stalks 14 and roots 15 fall into the portion of slot 68 cut by concave disk 61, and some falls within the area of slot 68 which was cut by insertion disk 70.

An alternative embodiment of the invention for plowing under plant stalks and roots utilizes an insertion disk 70 which is disposed in relation to concave disk 61, such that the lower arc of disk blade 71 intersects with the path of concave disk blade 61. This embodiment will deposit virtually all of stalks 14, roots 15, and inserted soil 77 in the portion of slot 68 which was opened by concave disk 61.

Yet another embodiment of the invention for plowing under plant stalks and roots utilizes a concave disk 71, disposed at an angle to the direction of travel with the leading edge of disk 71 outside the path of concave disk 61 and with the trailing edge of disk 71 within the path of concave disk 61, to achieve a slicing action of soil to be inserted 76, and as the invention 10 is drawn forward, a concave embodiment of disk 71 imparts a slight lateral moving action on stalks 14, roots 15, and inserted soil 77, moving stalks, roots and inserted soil toward the path of concave disk 61 as said stalks, roots, and soil are urged downward into slot 68 by gravity and engaging teeth 72.

Still referring to FIG. 4, as the implement 10 is drawn further forward, uplifted soil 55 spills out from between the concave surfaces of concave disk blades 61 and falls into slot 67, thus, burying stalks 14, roots 15, and inserted soil 77.

Figure 5:
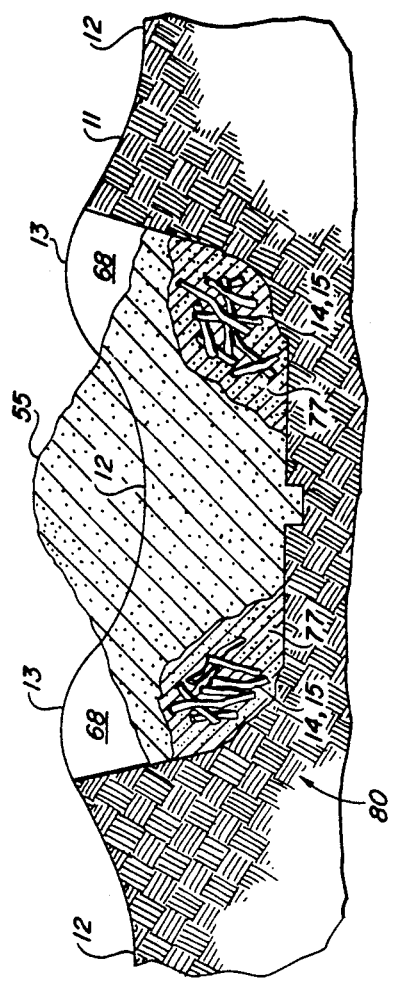
FIG. 5 is a cross-sectional view of a soil surface where plant stalks and roots have been plowed under using the embodiment of FIG. 1.

FIG. 5 illustrates a cross-sectional view of the earth surface after the implement 10 passes by. Inserted soil 77, together with plant stalks 14 and roots 15, lie buried beneath uplifted soil 55. Soil which remains undisturbed by this method and apparatus is generally referred to by the numeral 80. At this point, the farmer has the option of doing additional tillage, such as ripping into undisturbed soil 80, or can simply reform furrows 12 and beds 13 with implements commonly known in the art.

Figure 6:
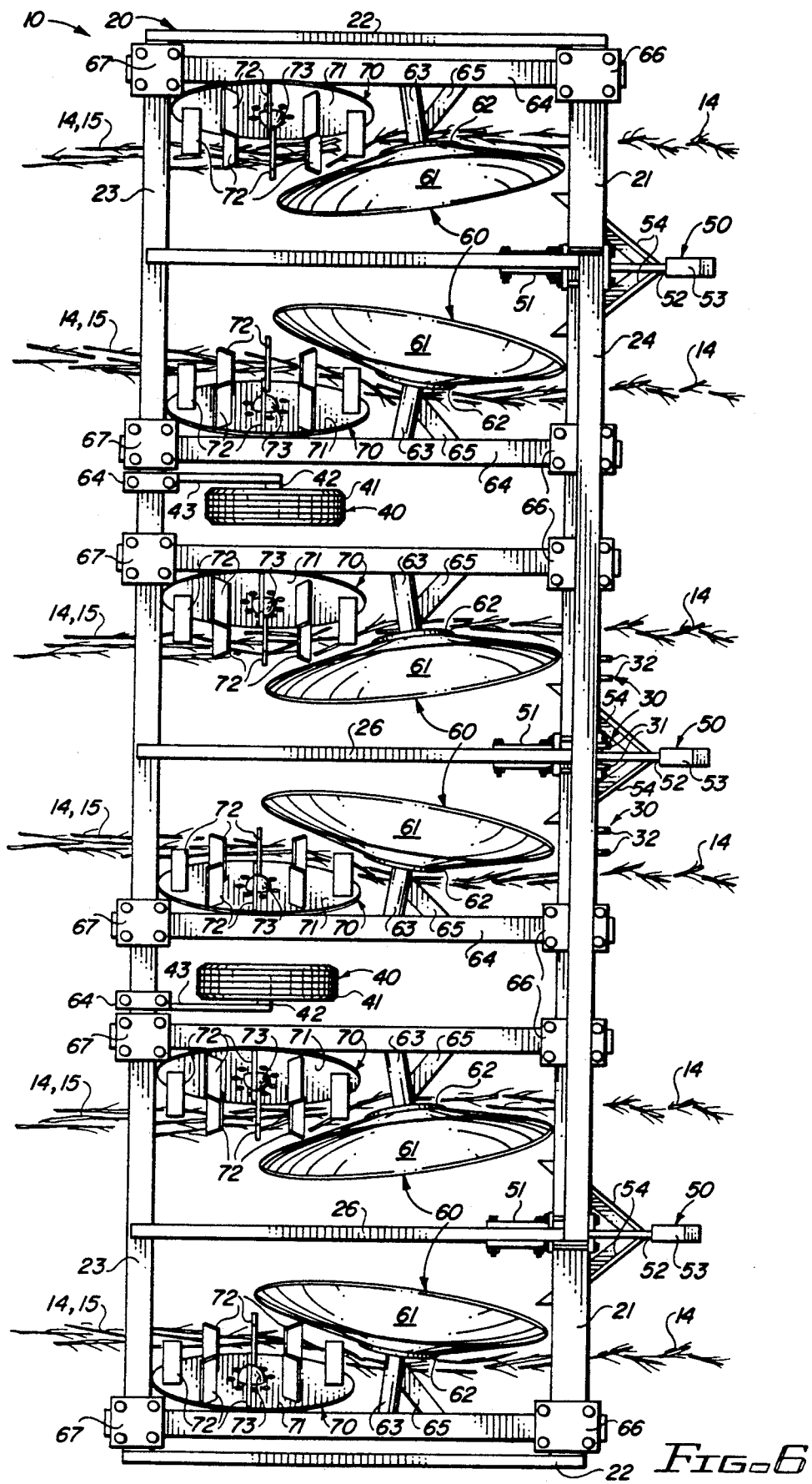
FIG. 6 is a to view of the embodiment of FIG. 1, configured to simultaneously plow under six rows of plant stalks and roots.

It is to be understood that this invention is not limited to working two beds 13 and adjacent furrows 12 at a time. An alternate embodiment, adapted to work six beds 13 at a time, is illustrated in Figure 6. This embodiment operates substantially the same as the previously described embodiment, with longer tool bars and three pairs of the previously described elements. This embodiment can be adapted to work beds 13, plant stalks 14, and roots 15 in substantially parallel rows with spacings of about 36 to 40 inches apart by locating gauge wheel assemblies 40, ripper assemblies 50, and longitudinal crossmembers 63 with all attached parts at the required spacings along tool frame 20.

Figure 7:
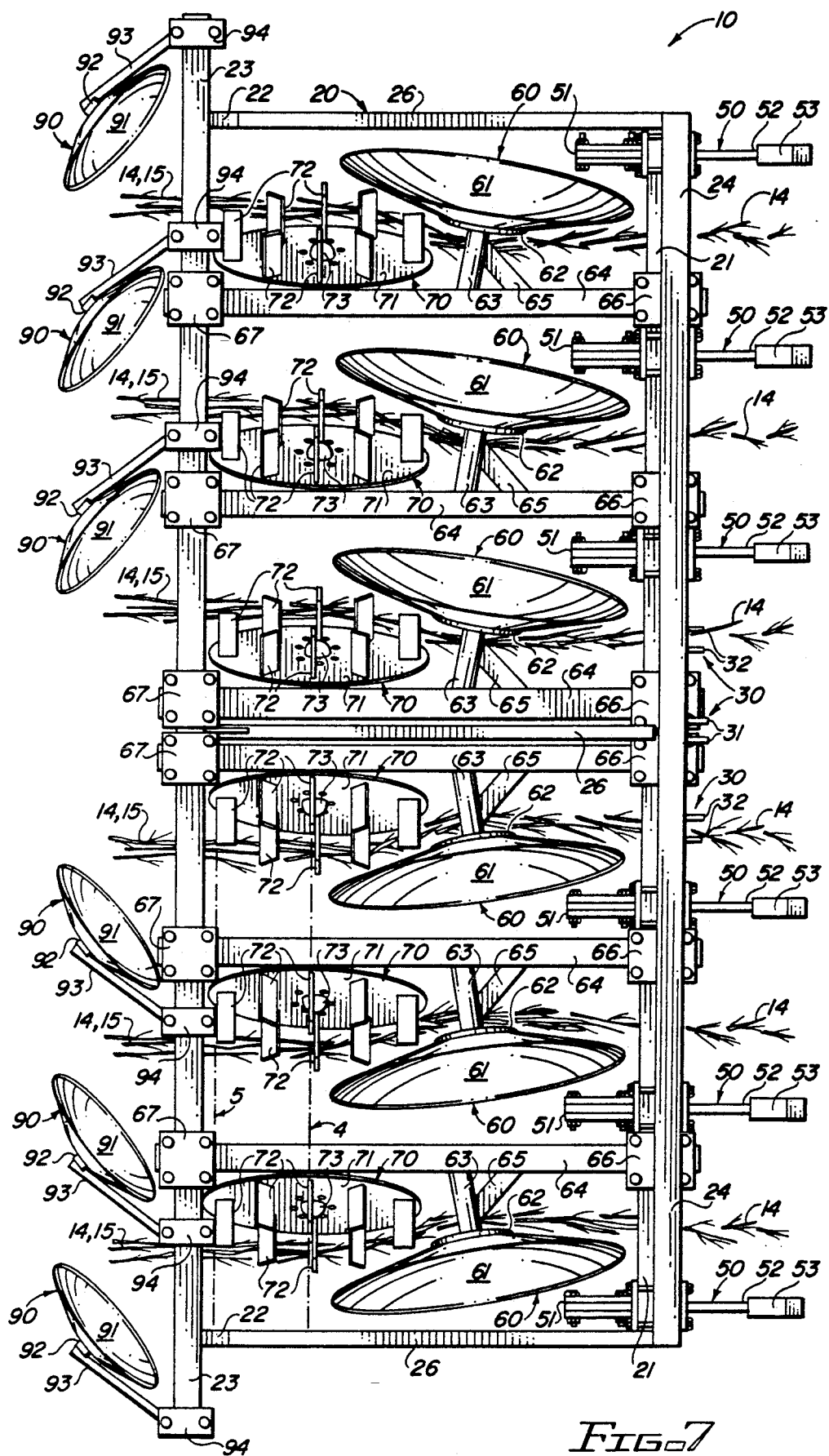
FIG. 7 is a top view of the invention configured to plow under six rows of plant stalks and roots grown as close together as thirty inches.

Yet another embodiment of the invention is illustrated in FIG. 7, adapted to work beds 13, plant stalks 14 and roots 15 in substantially parallel rows with spacings of about 30 inches apart. At this narrower row spacing, there is not enough clearance for uplifted soil 55 to pass between the concave surfaces of opposing concave disk blades 61 as previously described. At the central portion of tool frame 20 is a pair of concave disk blades with the concave surfaces facing outward from one another. Moving out from the center of tool frame 20, additional concave disk blades 61 are positioned with the concave surfaces facing away from the center of tool frame 20. To allow for penetration of concave disk blades 61, one ripper assembly 50 is utilized for each concave disk blade 61. As previously described, ripper shank assembly 50 is attached to lower front tool bar 21. In this embodiment, ripper shank assembly 50 does not utilize horizontal ripper blades 54. As previously described, ripper shank assemblies 50 may not be required for the operation of this invention in some soil conditions.

Figure 8:
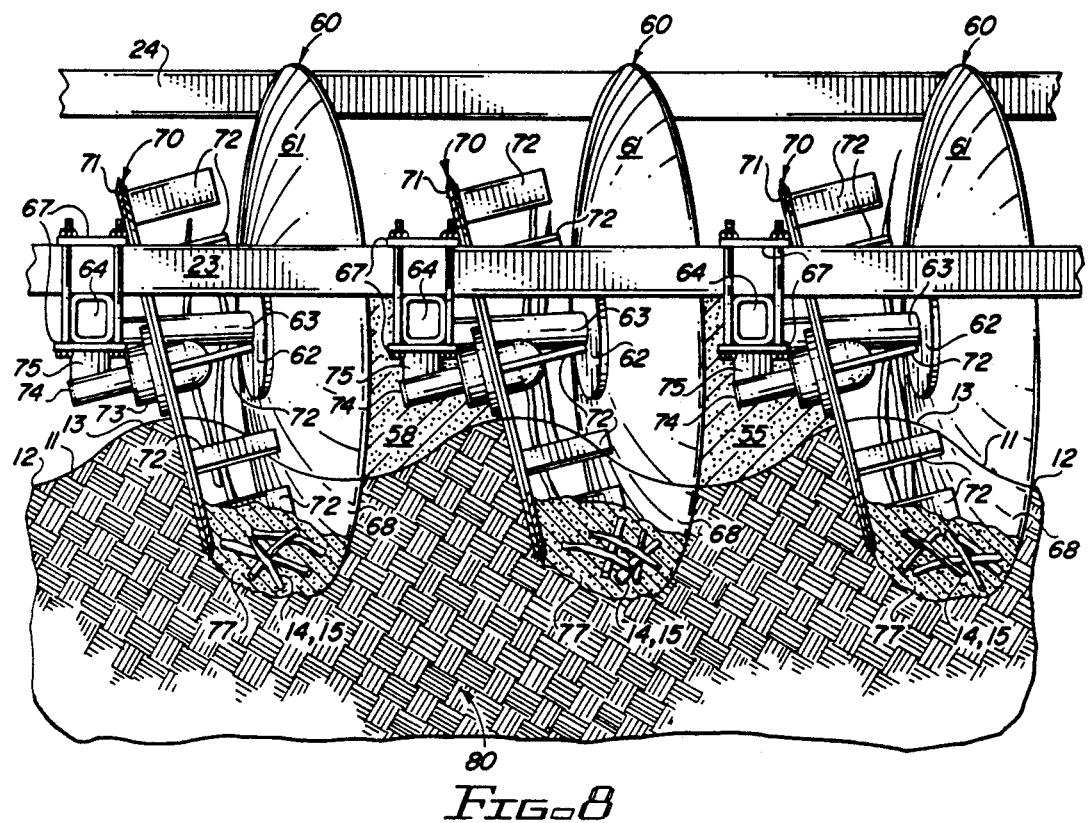
FIG. 8 is a partial rear schematic elevation of the embodiment illustrated in FIG. 7.

Now referring to FIG. 8, the arrangement of this embodiment allows concave disk blades 61 to displace soil upwardly and away from the concave surface of disk blade 61, momentarily forming slot 68. As with the previously described embodiments, inserted soil 77 from the peak of beds 13, together with plant stalks 14 and roots 15 is forced downward into slot 68 by insertion disk 70. Uplifted soil 55, which is displaced upwardly and laterally by disk blades 61, falls into slot 68 as the implement 10 moves forward, although the immediate coverage of inserted soil 77, stalks 14, and roots 15 is not as complete as in the previously described embodiments.

Figure 9:
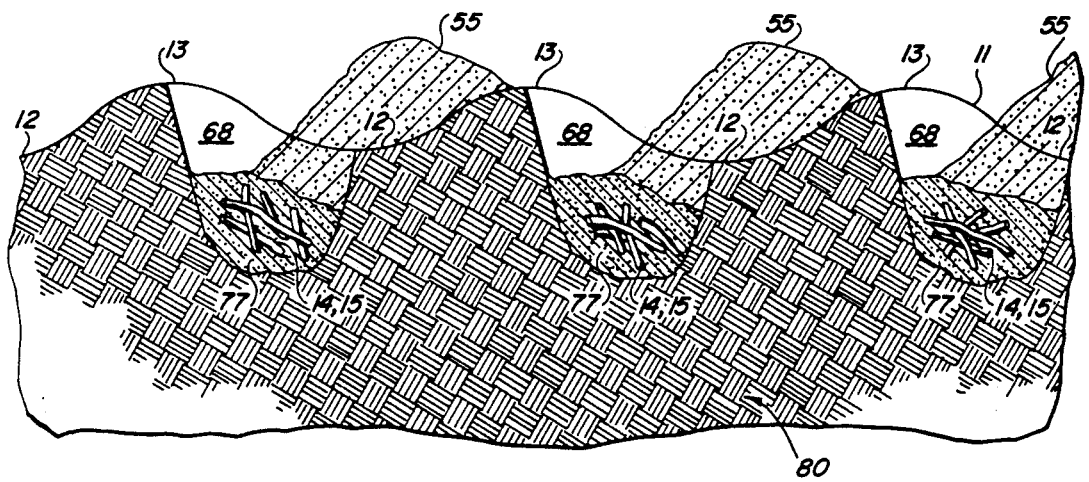
FIG. 9 is a cross-sectional view of the soil movement as affectuated by the embodiment first illustrated in Figure 7.

Now referring to Figure 9, it is apparent that, as with the previously described embodiments, slot 68 will not remain open on its own accord, hence, the soil to be inserted 76, stalks 14, and roots 15 must be simultaneously inserted into slot 68 as it is opened by concave disk 61. Although slot 68 is not as immediately and thoroughly covered by uplifted soil 55, as in the previously described embodiments, enough uplifted soil 55 would fall into slot 68 to prevent satisfactory insertion of stalks 14 and roots 15 into said slot. It is also apparent from FIG. 9, that this embodiment of the invention for plowing under plant stalks and roots momentarily causes a net lateral displacement of soil, as both inserted soil 77 and uplifted soil 55 are both deposited in a lateral relation to their original locations. To achieve a deeper burial of inserted soil 77, stalks 14 and roots 15, and to prevent a net displacement of soil from the swath of implement 10, furrowing disks, as shown in FIG. 7 and generally referred to by the numeral 90, are utilized at the rear of this embodiment. Furrowing disks 90 consist of deeply concave disk blades 91, freely rotating on hub and spindle assemblies 92, said hub and spindle assembly welded to shank 93, said shank is in turn welded to clamp assembly 94. Clamp assembly 94 bolts to rear tool bar 23. Furrowing disks 90 operate in the bottoms of furrows 12 to engage soil which is laterally displaced by concave disk blades 61, essentially moving said laterally displaced soil back to the path of concave disk blade 61, and completely covering slot 68. Gauge wheel assemblies are not required on this embodiment, as furrowing disks 90 hold the rear of the implement at a substantially constant height above soil surface 11.

It is to be understood that alternative embodiments of the invention can utilize one or more fixed soil engaging elements to achieve the same effects achieved by either or both of the rolling elements described herein, however, we have found rolling elements to be superior because they are far more resistant to plugging with debris.

Although the invention has been herein shown and described in what is conceived to be the most practical and preferred embodiment, it is recognized that departures may be made therefrom within the scope of the invention, which is not limited to the illustrative details disclosed.

What is claimed is:

1. An agricultural assemblage comprising:
    a) an agricultural vehicle for pulling an implement next to a row crop and having lifting means for raising the implement; and
    b) a crop embedding apparatus being attached to said lifting means and being towed behind said agricultural vehicle, said crop embedding apparatus having,
        1) furrow means for creating a temporary furrow in a lee portion of said furrow means as said crop embedding apparatus is pulled through soil, said temporary furrow being at least partially refilled with soil displaced by said furrow means due to gravity after passage of said furrow means, and
        2) packing means positioned in the lee portion for pushing stalks and roots of the row crop into said temporary furrow before said temporary furrow is at least partially refilled by soil.

2. The agricultural assemblage according to claim 1 further including soil ripping means for loosening soil, said soil ripping means located ahead of said furrow means.

3. The agricultural assemblage according to claim 2 wherein said packing means includes engaging teeth positioned substantially at right angles to a substantially circular flat coulter or concave disk blade.

4. The agricultural assemblage according to claim 3 where in said furrow means creates a slot being substantially deeper than its width.

5. The agricultural assemblage according to claim 4 wherein said furrow means is a substantially circular concave disk blade.

6. The agricultural assemblage according to claim 4 wherein said furrow means and said packing means are positioned to shear soil at an angle greater than forty-five degrees.

7. The agricultural assemblage according to claim 4 further including burying means for pushing soil into said furrow, said burying means being located behind said packing means.

8. The agricultural assemblage according to claim 7 further including adjustment means for adjusting the relative distance between said furrow means and said packing means.

9. The agricultural assemblage according to claim 8 further including means for raising the crop embedding apparatus such that said furrow means and said packing means do not contact the soil.

10. A crop burying apparatus for being pulled through soil said crop burying apparatus comprising:
    a) furrow means for creating a temporary furrow in a lee portion of said furrow means as said crop embedding apparatus is pulled through the soil, said temporary furrow being at least partially refilled with soil displaced by said furrow means after passage of said furrow means; and,
    b) packing means, positioned in the lee portion of said furrow means, for pushing stalks and roots of a row crop into said temporary furrow before said temporary furrow is at least partially refilled by soil.

11. The crop burying apparatus according to claim 10 further including soil ripping means for loosening soil, said soil ripping means located ahead of said furrow means.

12. The crop burying apparatus according to claim 11 wherein said packing means includes engaging teeth positioned substantially at right angles to a substantially circular flat coulter or concave disk blade.

13. The crop burying apparatus according to claim 12 wherein said furrow means creates a slot being substantially deeper than its width.

14. The crop burying apparatus according to claim 13 wherein said furrow means is a substantially circular concave disk blade.

15. The crop burying apparatus according to claim 13 wherein said furrow means and said packing means are positioned to shear soil at an angle greater than forty-five degrees.

16. The crop burying apparatus according to claim 15 further including burying means for pushing soil into the furrow, said burying means being located behind said packing means.

17. The crop burying apparatus according to claim 16 further including adjustment means for adjusting the relative distance between said furrow means and said packing means.

18. The crop burying apparatus according to claim 17 further including means for raising said furrow means and said packing means from contacting the soil.

19. A crop embedding apparatus for being towed behind an agricultural vehicle, the crop embedding apparatus comprising:
   a) furrow means for creating a temporary furrow in a lee portion of said furrow means; and
   b) packing means positioned in the lee portion for pushing stalks and roots of a row crop into said temporary furrow.

20. The crop embedding apparatus according to claim 19 further including root slicing means for cutting roots of said row crop.

21. The crop embedding apparatus according to claim 20 wherein said packing means includes engaging teeth positioned substantially at right angles to a substantially circular flat coulter or concave disk blade.

22. The crop embedding apparatus according to claim 21 wherein said furrow means creates a slot being substantially deeper than its width.

23. The crop embedding apparatus according to claim 22 wherein said furrow means is a substantially circular concave disk blade.

24. The crop embedding means according to claim 22 wherein said furrow means and said packing means are positioned to shear soil at an angle greater than forty-five degrees.

25. The crop embedding apparatus according to claim 24 further including burying means for pushing dirt into said furrow, said burying means being located after said packing means.

26. The crop embedding apparatus according to claim 25 further including adjustment means for adjusting the relative distance between said furrow means and said packing means.

27. The crop embedding apparatus according to claim 26 further including means for raising said furrow means and said packing means from contacting the soil.

28. An agricultural implement for being towed behind a tractor, said implement comprising:
   a) at least two crop embedding apparatuses, each of said crop embedding apparatuses having,
      1) furrow means for creating a temporary furrow in a lee portion of said furrow means; and
      2) packing means, positioned in the lee portion of said furrow means, for pushing stalks and roots off a row crop into said temporary furrow; and
   b) root slicing means for cutting roots of a crop, said root slicing means positioned to cut roots of two rows of crops.

29. The agricultural implement according to claim 28 wherein said packing means includes engaging teeth positioned substantially at right angles to a substantially circular flat coulter or concave disk blade.

30. The agricultural implement according to claim 29 wherein said furrow means creates a slot being substantially deeper than its width.

31. The agricultural implement according to claim 30 wherein said furrow means is a substantially circular concave disk blade.

32. The agricultural implement according to claim 30 wherein said furrow means and said packing means are positioned to shear soil at an angle greater than forty-five degrees.

33. The agricultural implement according to claim 32 further including burying means for pushing dirt into said furrow, said burying means being located behind said packing means.

34. The agricultural implement according to claim 33 further including adjustment means for adjusting the relative distance between said furrow means and said packing means.

35. The agricultural implement according to claim 34 further including means for raising said furrow means and said packing means from contacting the soil.

* * * * *